Figure 1:
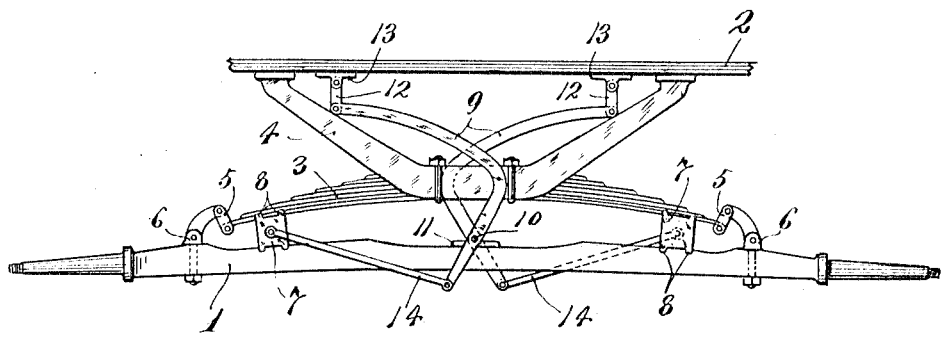

J. O. GILFILLAN.
VEHICLE SPRING.
APPLICATION FILED JULY 26, 1913.

1,117,369.  Patented Nov. 17, 1914.

Witnesses
A. H. Opsahl
E. C. Skinkle

Inventor
J O Gilfillan
By his Attorneys
Williamson & Merchant

UNITED STATES PATENT OFFICE.

JAMES O. GILFILLAN, OF NAPOLEAN, NORTH DAKOTA.

VEHICLE-SPRING.

1,117,369.  Specification of Letters Patent.  Patented Nov. 17, 1914.

Application filed July 26, 1913. Serial No. 781,411.

*To all whom it may concern:*

Be it known that I, JAMES O. GILFILLAN, a citizen of the United States, residing at Napolean, in the county of Logan and State of North Dakota, have invented certain new and useful Improvements in Vehicle Springs; and I do hereby declare the following to be a full, clear, and exact description of the invention, such as will enable others skilled in the art to which it appertains to make and use the same.

My invention relates to improvements in vehicle springs and has for its object to increase the efficiency of the same. As is well known, springs act more efficiently when carrying the full load for which they are designed than when carrying only a partial load. My invention is especially designed for use in connection with the springs of light, hard riding automobiles and provides means, operated either by hand or automatically, for throwing more or less of the vehicle springs out of action, depending on the load carried.

To the above ends, generally stated, the invention consists of the novel devices and combinations of devices hereinafter described and defined in the claims.

In the accompanying drawings, which illustrate the invention, like characters indicate like parts throughout the several views.

Figure 2:
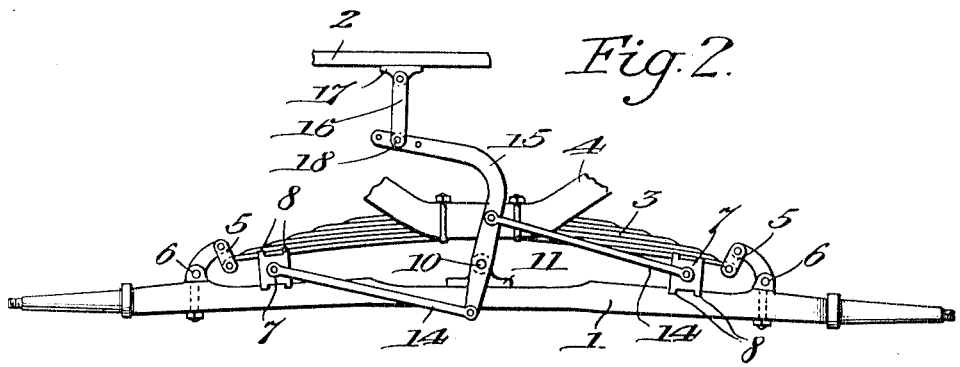

Referring to the drawings:

Figure 1 is an end elevation, showing one form of my invention, some parts being broken away; and Fig. 2 is an end elevation, showing another form of the invention.

Referring first to the invention as illustrated in Fig. 1, the numeral 1 indicates one of the axles of a vehicle running gear and the numeral 2 indicates the vehicle body. This body 2 is supported on the axle 1 by a single elliptical spring 3 made up of a plurality of leaves rigidly clamped, at their intermediate portions, to a depending channel bracket 4 secured to the under side of the body 2. Links 5 pivotally connect the ends of the spring 3 to main bearings 6 secured to and projecting above the axle 1. The parts thus far described may be of standard or any desired construction.

The numeral 7 indicates a pair of auxiliary bearing blocks for the spring 3. These bearing blocks 7 are slidably mounted on the axle 1 and are provided with reversely projecting lips 8, which embrace the axle 1 and spring 3, to guide said bearings in their sliding movement.

A pair of levers 9 automatically adjust the auxiliary bearing blocks 7 toward and from each other, for the purpose of varying the operative length of the spring 3. These levers 9 are intermediately pivoted at 10 to a common bearing 11 anchored to the intermediate portion of the axle 1 on the upper face thereof. The upper or long ends of the levers 9 are curved upwardly and outwardly and are pivotally secured by links 12 to bearings 13 on the under side of the body 2. Long links 14 pivotally connect the short ends of the levers 9 to the auxiliary bearing blocks 7. The short or lower end of each lever 9 extends downwardly and outwardly on the same side of the vehicle as the upper end thereof and is connected to the auxiliary bearing block on the same side of the vehicle by a long link 14. By connecting the two ends of each lever 9 on the same side of the vehicle, the auxiliary bearing blocks 7 will automatically adjust themselves to offset unevenly distributed weight on the vehicle body. For instance, if a person is entering the vehicle on the right hand side, the auxiliary bearing block 7 on the right hand side of the vehicle will automatically move inward to shorten the operative length of the adjacent end of the spring 3 and thereby decrease its elasticity. Obviously, under increased load in the vehicle, the levers 9 through the links 13 will draw the auxiliary bearing blocks 7 inward and toward each other, thereby shortening the operative length of each end of the spring and decreasing its elasticity, in order to overcome the additional load.

In the construction shown in Fig. 2, a single lever 15 is used in place of the two levers shown in Fig. 1. The lever 15 is intermediately pivoted at 10 to the bearing 11 and the inner ends of the links 14 are pivotally secured thereto, one on each side of said pivotal connection. A link 16 connects the upper or long end of the lever 15 to a bearing 17 on the under side of the body 2. This link 16 is adjustably connected to the lever 15 by a pin 18 insertible through any one of a plurality of longitudinally spaced perforations formed in the lever 15, for the purpose of varying the operative movement of the auxiliary bearing blocks 7.

What I claim is:

1. A vehicle spring, a spring-adjusting element, and a connection from the vehicle body to said spring-adjusting element, actuated by the movement of said body with respect to the running gear, for throwing more or less of said spring out of action.

2. A vehicle spring, bearings for said spring, and connections between said bearings and the body of the vehicle for automatically adjusting said bearings toward and from each other by the movement of said body in respect to the running gear of said vehicle.

3. A vehicle spring, main and auxiliary bearings supporting said spring from the vehicle running gear, lever connections between the running gear and the vehicle body actuated by the movement of the one in respect to the other, and independent connections between said auxiliary bearings and said levers for automatically adjusting said bearings toward and from each other.

4. A vehicle spring, main and auxiliary bearings supporting said spring from the vehicle running gear, and a pair of levers intermediately pivoted to said running gear, both ends of each lever being connected on the same side of the vehicle, one to the body and the other to one of the auxiliary bearing blocks, so that, under the depression of one side of the vehicle, the operative length of the adjacent end of the spring will be shortened by the adjustment of the auxiliary bearing block supporting the same.

In testimony whereof I affix my signature in presence of two witnesses.

JAMES O. GILFILLAN.

Witnesses:
O. F. BRYANT,
MARY SABRAN.